US012812690B2

(12) United States Patent
Oh et al.

(10) Patent No.: US 12,812,690 B2
(45) Date of Patent: Nov. 24, 2026

(54) METHOD AND DEVICE FOR PERFORMING RANDOM ACCESS IN WIRELESS COMMUNICATION SYSTEM

(71) Applicant: LG Electronics Inc., Seoul (KR)

(72) Inventors: Yoonsuk Oh, Seoul (KR); Kijun Kim, Seoul (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 408 days.

(21) Appl. No.: 18/697,131

(22) PCT Filed: Sep. 30, 2022

(86) PCT No.: PCT/KR2022/014722

§ 371 (c)(1),
(2) Date: Sep. 24, 2024

(87) PCT Pub. No.: WO2023/055158

PCT Pub. Date: Apr. 6, 2023

(65) Prior Publication Data

US 2025/0071816 A1 Feb. 27, 2025

(30) Foreign Application Priority Data

Oct. 1, 2021 (KR) ........................ 10-2021-0131034

(51) Int. Cl.
*H04W 74/0833* (2024.01)
*H04W 72/21* (2023.01)

(52) U.S. Cl.
CPC ....... *H04W 74/0833* (2013.01); *H04W 72/21* (2023.01)

(58) Field of Classification Search
None
See application file for complete search history.

(56) References Cited

U.S. PATENT DOCUMENTS 11,202,323 B2 * 12/2021 Zhao ................. H04W 72/1268
11,284,420 B2 * 3/2022 Lin ........................ H04W 72/04
(Continued)

FOREIGN PATENT DOCUMENTS

KR 10-2020- 0086683 7/2020

OTHER PUBLICATIONS

Office Action in Korean Appln. No. 10-2024-7006766, mailed on Aug. 20, 2025, 13 pages (with English translation).
(Continued)

*Primary Examiner* — Faiyazkhan Ghafoerkhan
(74) *Attorney, Agent, or Firm* — Fish & Richardson P.C.

(57) ABSTRACT

Disclosed are a method and device for performing random access in a wireless communication system. The method for performing, by a UE, a random access procedure in a wireless communication system, according to one embodiment of the present disclosure, may comprise the steps of: receiving, from a base station, information about a MCS index group for a Msg3 PUSCH based on repetition transmission for the Msg3 PUSCH being configured, the MCS index group comprising at least one MCS index value; receiving, from the base station, MCS information indicating a specific MCS index value among the at least one MCS index value; and transmitting the Msg3 PUSCH on the basis of the specific MCS index value indicated by the MCS information.

11 Claims, 10 Drawing Sheets

(56) References Cited

U.S. PATENT DOCUMENTS

| | | | | |
|---|---|---|---|---|
| 11,291,040 | B2 * | 3/2022 | Tirronen | H04B 7/0626 |
| 11,395,182 | B2 * | 7/2022 | Liu | H04L 1/0004 |
| 11,399,394 | B2 * | 7/2022 | Höglund | H04W 74/004 |
| 11,445,553 | B2 * | 9/2022 | Luo | H04L 1/18 |
| 11,497,026 | B2 * | 11/2022 | MolavianJazi | H04B 17/328 |
| 11,510,249 | B2 * | 11/2022 | Irukulapati | H04L 5/0051 |
| 11,812,476 | B2 * | 11/2023 | Höglund | H04W 74/004 |
| 11,832,310 | B2 * | 11/2023 | Seok | H04B 1/713 |
| 11,882,548 | B2 * | 1/2024 | Höglund | H04W 72/23 |
| 12,156,191 | B2 * | 11/2024 | Xiong | H04L 1/08 |
| 12,245,292 | B2 * | 3/2025 | Seok | H04B 1/713 |
| 12,245,293 | B2 * | 3/2025 | Seok | H04B 1/713 |
| 12,418,898 | B2 * | 9/2025 | Cozzo | H04L 5/0048 |
| 12,432,787 | B2 * | 9/2025 | Maamari | H04W 74/002 |
| 12,501,480 | B2 * | 12/2025 | Tirronen | H04W 74/004 |
| 12,538,301 | B2 * | 1/2026 | Pi | H04L 1/189 |
| 2016/0057735 | A1 * | 2/2016 | Liu | H04W 72/04 370/329 |
| 2020/0196355 | A1 * | 6/2020 | Zhao | H04W 72/1268 |
| 2020/0344818 | A1 * | 10/2020 | Höglund | H04W 74/004 |
| 2020/0383134 | A1 * | 12/2020 | Tirronen | H04B 7/0626 |
| 2021/0045160 | A1 * | 2/2021 | Irukulapati | H04L 5/0051 |
| 2021/0058823 | A1 * | 2/2021 | Liu | H04L 1/0004 |
| 2021/0058947 | A1 * | 2/2021 | Lin | H04W 72/04 |
| 2021/0076384 | A1 * | 3/2021 | MolavianJazi | H04B 17/328 |
| 2021/0378017 | A1 * | 12/2021 | Luo | H04L 1/18 |
| 2021/0385856 | A1 * | 12/2021 | Irukulapati | H04L 5/0051 |
| 2022/0039068 | A1 * | 2/2022 | Hoglund | H04W 72/23 |
| 2022/0046623 | A1 * | 2/2022 | Xiong | H04L 1/08 |
| 2022/0174726 | A1 * | 6/2022 | Tirronen | H04W 74/004 |
| 2022/0279589 | A1 * | 9/2022 | Taherzadeh Boroujeni | H04L 1/0016 |
| 2022/0304070 | A1 * | 9/2022 | Höglund | H04W 74/004 |
| 2022/0312413 | A1 * | 9/2022 | Cozzo | H04L 1/0003 |
| 2023/0199861 | A1 * | 6/2023 | Maamari | H04W 74/002 370/329 |
| 2023/0247680 | A1 * | 8/2023 | Seok | H04B 1/713 |
| 2023/0276436 | A1 * | 8/2023 | Pi | H04L 1/189 370/329 |
| 2024/0073965 | A1 * | 2/2024 | Seok | H04B 1/713 |
| 2024/0147538 | A1 * | 5/2024 | Seok | H04B 1/713 |
| 2025/0071816 | A1 * | 2/2025 | Oh | H04L 1/08 |

OTHER PUBLICATIONS

Huawei, HiSilicon, "Msg3 repetition for coverage enhancement," 3GPP TSG RAN WG1 Meeting #106-e, R1-2106499, E-meeting, Aug. 16-27, 2021, 9 pages.

Intel Corporation, "On Msg3 PUSCH repetition," 3GPP TSG RAN WG1 #106-e, R1-2107606, e-Meeting, Aug. 16-27, 2021, 8 pages.

International Search Report and Written Opinion in Appln. No. PCT/KR2022/014722, mailed on Jan. 25, 2023, 6 pages (with English translation).

Nokia, Nokia Shanghai Bell, "Approaches and solutions for Type A PUSCH repetitions for Msg3," 3GPP TSG RAN WG1 #106-e, R1-2106659, e-Meeting, Aug. 16-27, 2021, 19 pages.

Samsung, "Type A PUSCH repetitions for Msg3," 3GPP TSG RAN WG1 #106-e, R1-2106906, e-Meeting, Aug. 16-27, 2021, 10 pages.

* cited by examiner

METHOD AND DEVICE FOR PERFORMING RANDOM ACCESS IN WIRELESS COMMUNICATION SYSTEM

CROSS-REFERENCE TO RELATED APPLICATIONS

This application is a National Stage application under 35 U.S.C. § 371 of International Application No. PCT/KR2022/014722, filed on Sep. 30, 2022, which claims the benefit of Korean Application No. 10-2021-0131034, filed on Oct. 1, 2021. The disclosures of the prior applications are incorporated by reference in their entirety.

TECHNICAL FIELD

The present disclosure relates to a wireless communication system, and in more detail, relates to a method and an apparatus of performing a random access procedure in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical object of the present disclosure is to provide a method and apparatus for performing a random access procedure in a wireless communication system.

A technical object of the present disclosure is to provide a method and apparatus for configuring/indicating repetition transmission of Message 3 (Msg 3) PUSCH in performing a random access procedure.

The technical objects to be achieved by the present disclosure are not limited to the above-described technical objects, and other technical objects which are not described herein will be clearly understood by those skilled in the pertinent art from the following description.

A method of performing random access procedure by a user equipment (UE) in a wireless communication system according to an aspect of the present disclosure may comprise: receiving, from a base station, information on a Modulation and Coding Scheme (MCS) index group for the Message 3 Physical Uplink Shared Channel (Msg3 PUSCH), based on repetition transmission of the Msg3 PUSCH being configured, the MCS index group includes one or more MCS index values; receiving, from the base station, MCS information indicating a specific MCS index value among the one or more MCS index values; and transmitting the Msg3 PUSCH based on the specific MCS index value indicated by the MCS information. Herein, the MCS information may be configured to some bits of an MCS field related to the Msg3 PUSCH.

A method of performing random access procedure by a base station in a wireless communication system according to an additional aspect of the present disclosure may comprise: transmitting, to a user equipment (UE), information on a Modulation and Coding Scheme (MCS) index group for the Message 3 Physical Uplink Shared Channel (Msg3 PUSCH), based on repetition transmission of the Msg3 PUSCH being configured, the MCS index group includes one or more MCS index values; transmitting, to the UE, MCS information indicating a specific MCS index value among the one or more MCS index values; and receiving the Msg3 PUSCH based on the specific MCS index value indicated by the MCS information. Herein, the MCS information may be configured to some bits of an MCS field related to the Msg3 PUSCH.

According to an embodiment of the present disclosure, a higher Modulation and Coding Scheme (MCS) value may be indicated/designated without increasing the number of bits for designating/indicating a MCS in downlink control information.

In addition, according to an embodiment of the present disclosure, when transmitting PUSCH of Msg 3 during a random access procedure, it is possible to effectively use frequency resources by adaptively indicating various MCS even in a situation where a limited MCS field is used, and resource efficiency may be improved by applying MCS to use a small amount of frequency resources.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
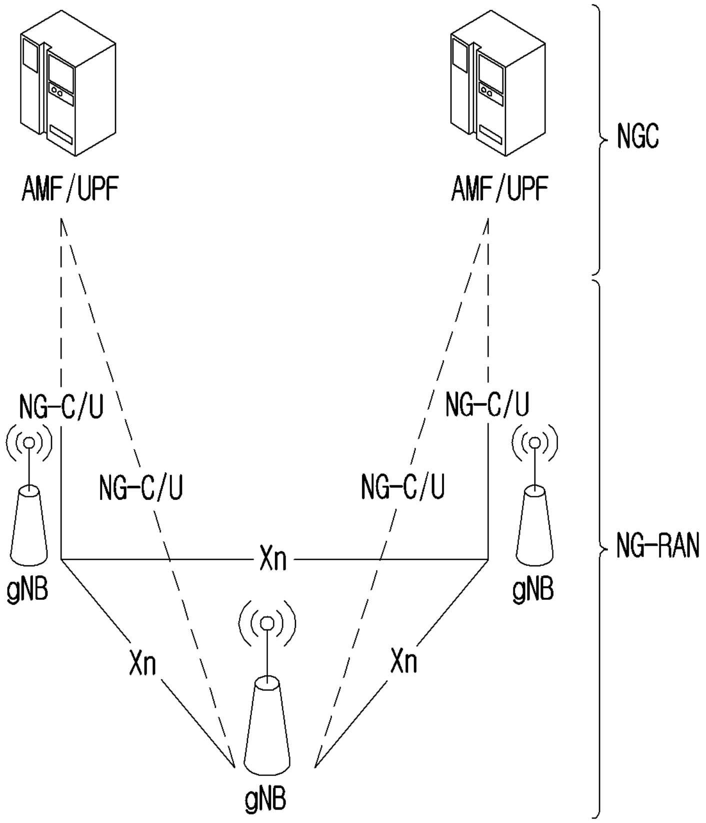
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), an SS(Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS(General Packet Radio Service)/EDGE(Enhanced Data Rates for GSM Evolution). OFDMA may be implemented by a radio technology such as IEEE 802.11(Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
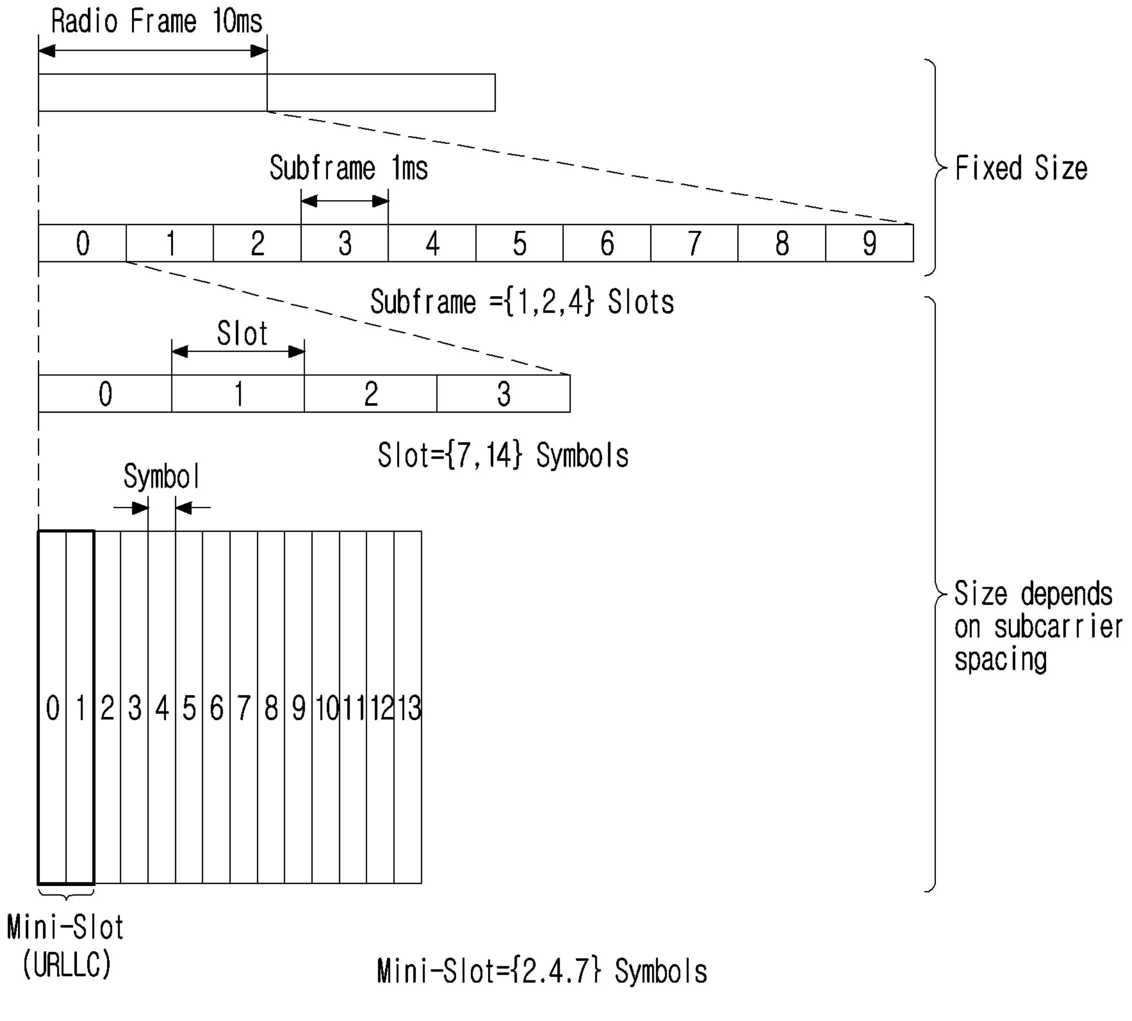
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_{s,f}^{\mu}\in\{0, \ldots, N_{slot}^{subframe,\mu}-1\}$ in a subframe and are numbered in an increasing order of $n_{s,f}^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
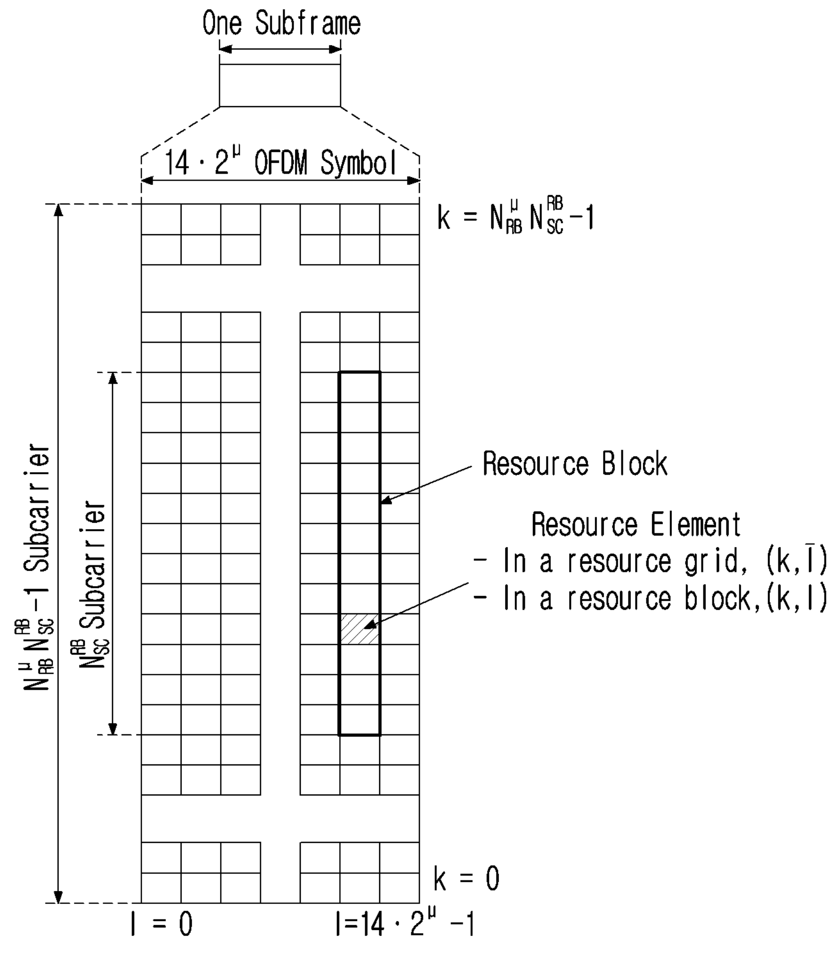
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}N_{sc}^{RB}$ subcarriers in a frequency domain and one subframe is configured with $14\cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu}\leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
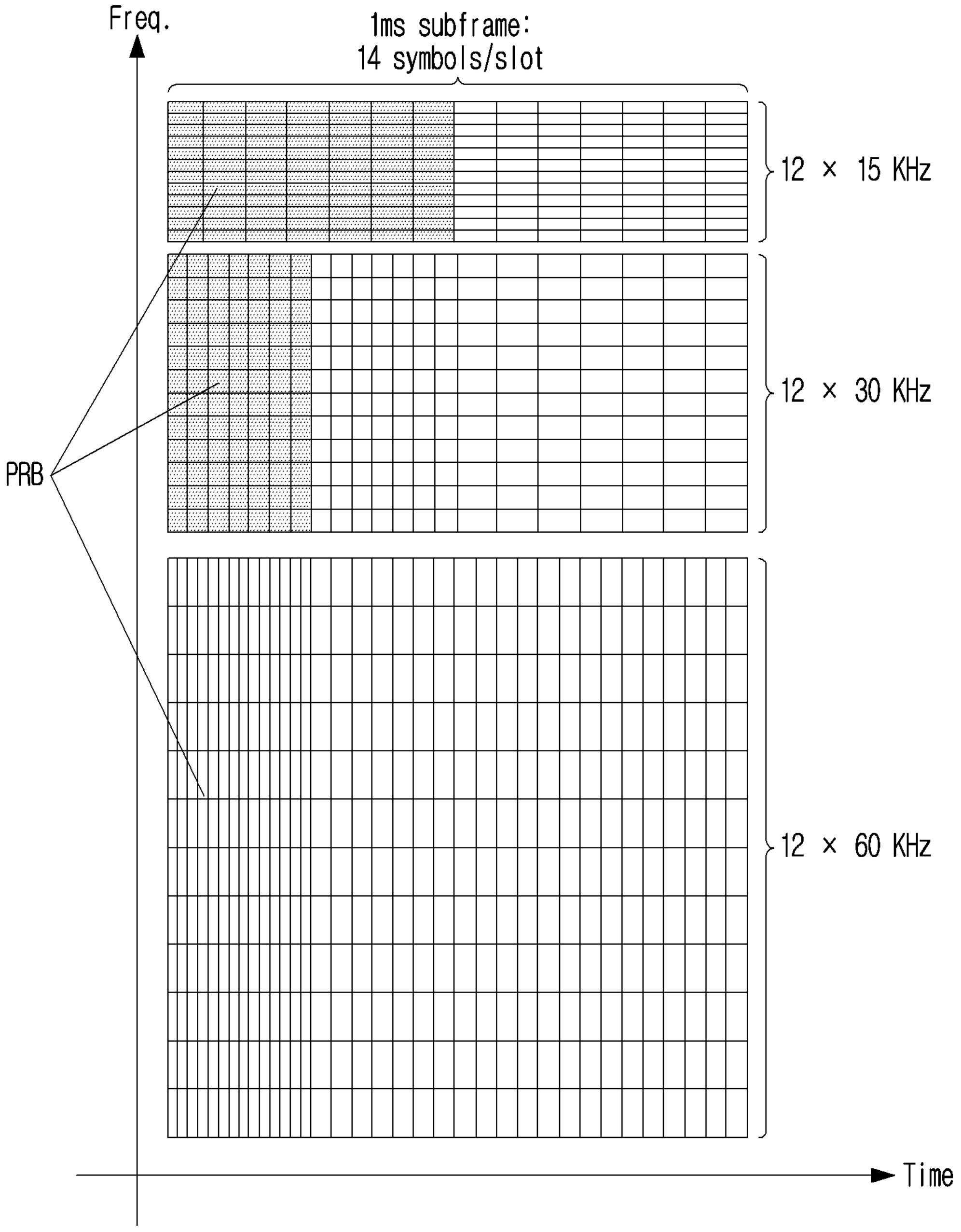
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
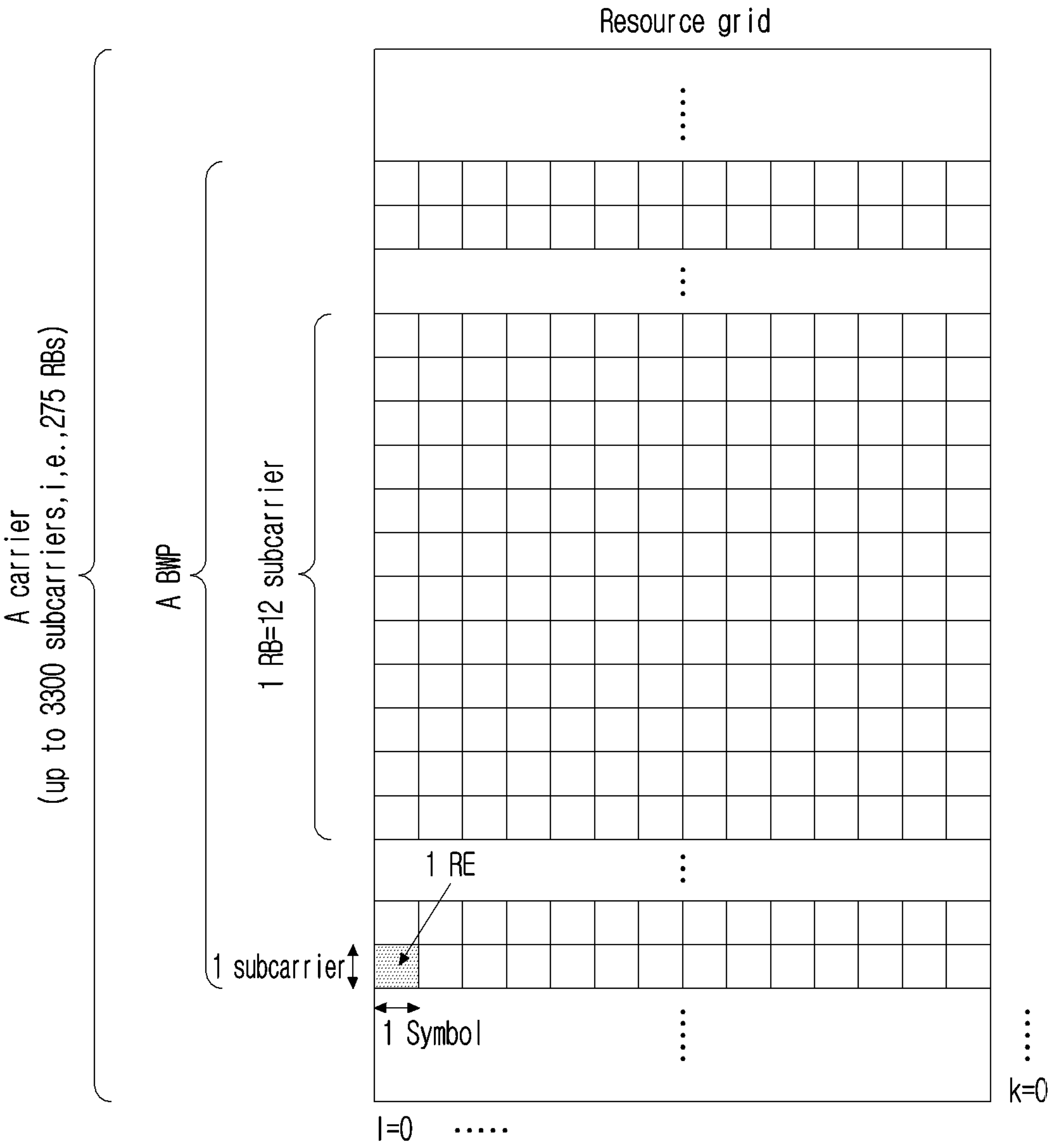
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
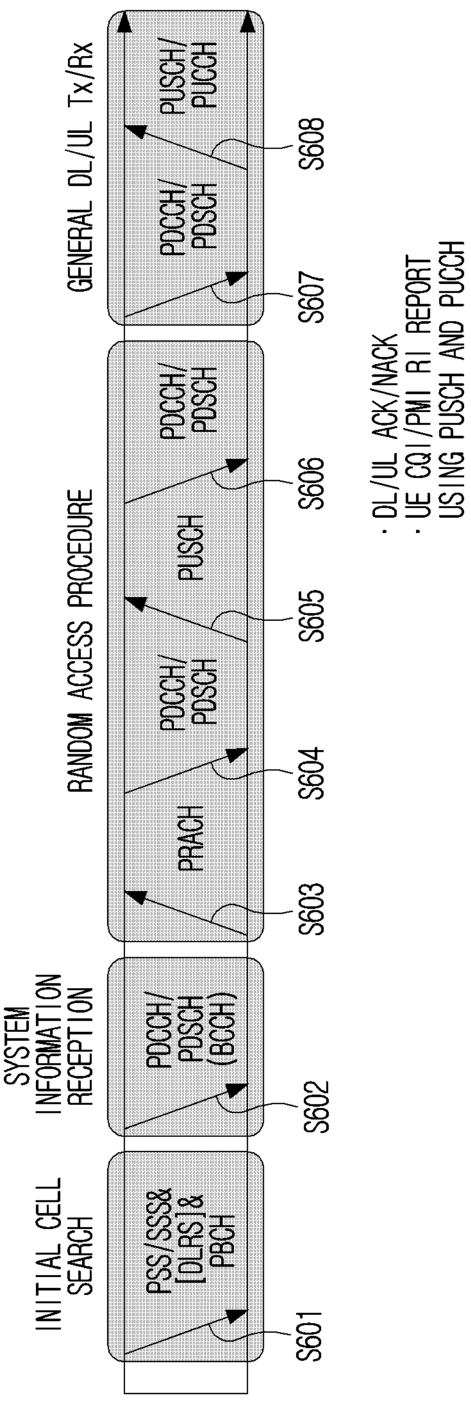
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgement/Non-Acknowledgement) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid-Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI(Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block(TB) (e.g., MCS, NDI, RV, etc.), information related to a HARQ (e.g., a process number, DAI, PDSCH-HARQ feedback timing, etc.), information related to multiple antennas (e.g., an antenna port, a TCI(transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Random Access Procedure in NR System

For the UE to connect to the NR network, the UE shall be synchronized not only for the DL but also for the UL. DL synchronization is performed by the UE detecting and decoding the SSB and PBCH broadcasted by the base station. For UL synchronization, the UE shall perform a random access procedure with the base station. Random access procedures are broadly classified into two types as follows.

Contention Based Random Access (CBRA)

Contention Free Random Access (CFRA)

CBRA includes the Msg3 transmission process of the UE, but CFRA does not include the Msg3 transmission process. Since the present disclosure proposes content related to PUSCH repetition transmission of Msg3, only CBRA is described.

Figure 7:
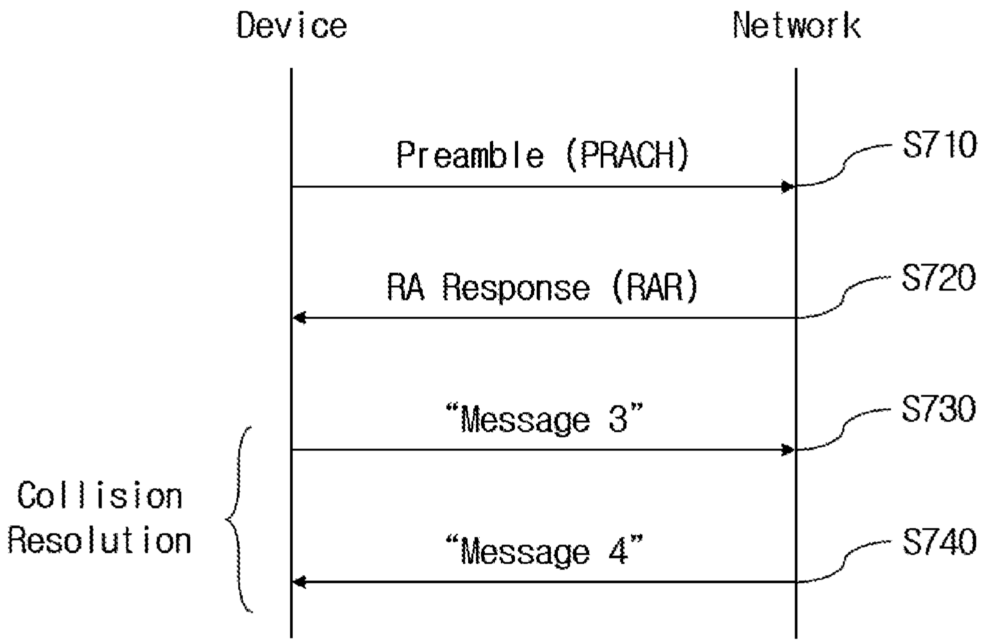
FIG. 7 illustrates a 4-step contention-based random access procedure in a wireless communication system to which the present disclosure may be applied.

FIG. 7 illustrates a 4-step contention-based random access procedure in a wireless communication system to which the present disclosure may be applied.

Referring to FIG. 7, the first process in CBRA is the process of randomly selecting one preamble from a preamble pool shared by a UE with other UEs and transmitting it to the base station. This means that a collision may occur by selecting the same preamble at the same time as another UE. The base station performs a contention resolution mechanism in the subsequent process to handle these collisions.

Specifically, in step S710, the UE transmits a randomly selected preamble (i.e., RA preamble) to the base station. Through this, a random access procedure is initiated.

In step S720, the base station transmits an RA response (RAR) corresponding to a response to the preamble to the UE through the PDSCH. Here, the RAR includes preamble identification information (e.g. ID, etc.), UL grant for msg3, Timing alignment (TA) information, temporary C-RNTI information, etc.

After transmitting the preamble, the UE monitors the PDCCH and attempts to receive RAR within the RAR reception window. If the UE receives a response including identification information corresponding to the transmitted RA preamble, the UE determines that the RA preamble transmission was successful. Thereafter, in step S730, the UE transmits Msg3 to the base station using the UL grant information in the RAR.

If the RAR containing identification information corresponding to the RA preamble transmitted by the UE is not received within the RAR reception window, the UE determines that the RA preamble transmission has failed and retransmits the RA preamble.

In step S740, the base station that received Msg3 transmits Msg4 to the UE for contention resolution and connection establishment (e.g., connection set up, RRC connection establishment, etc.).

Here, the RAR UL grant included in RAR includes parameter information required for Msg3 transmission.

Table 6 shows an example of a RAR UL grant in the NR system.

TABLE 6

| RAR grant field | Number of bits |
|---|---|
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |

According to the current NR standardization standard, Msg3 PUSCH is restricted to single-slot transmission that does not perform repetition transmission.

Table 7 shows an example of specifications related to Msg3 PUSCH transmission in the current NR system.

TABLE 7

| |
|---|
| A UE transmits a transport block in a PUSCH scheduled by a RAR UL grant in a corresponding RAR message using redundancy version number 0. If a TC-RNTI is provided by higher layers, the scrambling initialization of the PUSCH corresponding to the RAR UL grant in clause 8.2 is by TC-RNTI. Otherwise, the scrambling initialization of the PUSCH corresponding to the RAR UL grant in clause 8.2 is by C-RNTI. Msg3 PUSCH retransmissions, if any, of the transport block, are scheduled by a DCI format 0_0 with CRC scrambled by a TC-RNTI provided in the corresponding RAR message [11, TS 38.321]. The UE always transmits the PUSCH scheduled by a RAR UL grant without repetitions. |

Additionally, in relation to the current discussion on standardization of coverage enhancement, Msg3 PUSCH is being considered as one of the channels that needs coverage improvement, and discussion on improving coverage for Msg3 PUSCH may correspond to the matters shown in Table 8 below.

TABLE 8

| Msg3 PUSCH enhancement is studied including at least Msg3 PUSCH repetition. |
|---|
| Enhancement to PUSCH scheduled by RAR UL grant does not consider the optimization specific for CFRA case.<br>Enhancements on Msg3 PUSCH repetition were studied from several aspects, including<br>- the indication of the number of repetitions for Msg3 initial transmission and re-transmission,<br>- the repetition type,<br>- the feasibility and applicability of enhancements studied for PUSCH in RRC_CONNECTED state for Msg3 PUSCH initial and re-transmission,<br>- inter-slot frequency hopping<br>- and differentiation between enhanced UE and legacy UE.<br>Power domain-based solutions were studied for Msg3 PUSCH, including<br>- pi/2 BPSK waveform using DFT-s-OFDM<br>- and power control enhancements.<br>Spatial domain based solutions were studied from several aspects for Msg3 PUSCH, including<br>- spatial filter setting between PRACH transmission<br>- and corresponding Msg3 PUSCH transmission and open-loop transmission diversity. |

Referring to Table 8, in order to improve the coverage of Msg3 PUSCH, the introduction of repetitive transmission of Msg3 PUSCH is being considered, and accordingly, configuration/indication methods related to the number of repetitions, repetition types, etc. need to be additionally discussed/considered.

Method for Configuring/Indicating MCS Related to Msg3 PUSCH Repetition Transmission The Modulation and Coding scheme (MCS) table used for general PUSCH transmission includes 32 MCS indexes. In order for the base station to select one of the MCS indexes and indicate it to the UE, a 5-bit MCS field is required. As an example, the MCS field of DCI format 0_0, which indicates general PUSCH transmission, is configured/defined to have a length of 5 bits.

Regarding Msg3 PUSCH transmission in the above-described random access procedure, the MCS index to be applied by the UE to Msg3 PUSCH transmission may be indicated from the base station through the MCS field included in the RAR UL grant. As an example, referring to Table 6 above, the MCS field of the RAR UL grant is configured/defined to be 4 bits long, unlike other general MCS fields. The value indicated through this is interpreted as the MCS index of the first 16 MCS tables applicable to the UE and applied to Msg3 PUSCH transmission. That is, the UE may determine the MCS of Msg3 PUSCH transmission from the 16 indexes of the applicable MCS index table predefined for PUSCH.

At this time, as repetition transmission is introduced for Msg3 PUSCH to improve coverage, as described above, there is discussion in standardization about how the base station may indicate the repetition number to be applied by the UE. In this regard, one of the time domain resource assignment (TDRA) field, MCS field, or TPC field among the fields of the RAR UL grant may be selected and used to indicate the number of repetitions. NR standardization discussions related to this are shown in Table 9 below.

TABLE 9

| Working Assumption |
|---|
| Down-select only one from the following methods for indication of the number of repetition of Msg3 initial transmission.<br>- Alt 1: If TDRA information field is chosen, introducing a new configurable TDRA table including the repetition factors.<br>-- The new TDRA table is configured by SIB1, with selecting one of the two options below.<br>--- Option 1: The new TDRA table includes separate new indication for K2, mapping type, SLIV and repetition factor.<br>--- Option 2: The new TDRA table includes legacy indication for K2, mapping type and SLIV from legacy TDRA table, and new indication for repetition factor.<br>-- If a new TDRA table is not configured, the legacy default TDRA table is used, and repetition factor K=1 is applied.<br>- Alt 2: If MCS information field is chosen, repurpose the MCS information field as follows.<br>-- X MSB bits of the MCS information field are used for repetition indication.<br>---- FFS the value of X.<br>---- FFS whether the X bits are directly used for indicating the repetition factor (i.e., the decimal value of X is equal to the repetition factor) or used for selecting one repetition factor from a predefined/SIB1 configured set.<br>- Alt 3: If TPC information field is chosen, repurpose the TPC information field by selecting one of the two options below.<br>-- Option 1: X LSB bits of the TPC information field are used for repetition indication.<br>---- FFS the value of X.<br>---- FFS whether the X bits are directly used for indicating the repetition factor (i.e., the decimal value of X is equal to the repetition factor) or used for selecting one repetition factor from a predefined/SIB1 configured set.<br>-- Option 2: A predefined TPC command table with including repetition factor K is introduced. |

If the number of repetitions is indicated using the MCS field, and a certain bit (e.g., X bit) of the 4-bit MCS field is used for this, unlike the existing case, MCS index information for Msg3 transmission may need to be indicated through only some bits (e.g., 4−X bits) of the MCS field.

At this time, considering the MCS index indication method for coverage improvement and existing Msg3 transmission, a method of using the first 2^(4−X) consecutive MCS indices to correspond to the number of bits (e.g., 4−X) of the remaining MCS field may be considered. However, in the case of this method, the rate (e.g. coding rate) is always limited to lower MCS use, which may be inefficient in terms of resource management.

In order to solve these problems, sa method by which the base station may indicate the appropriate/proper MCS index to the UE using the remaining part of the MCS field, when Type A PUSCH repetition (i.e., Type A PUSCH repetition) is applied to Msg3 PUSCH transmission in order to improve the coverage of the UE and the number of repetitions is indicated through part of the MCS field of the RAR UL grant will be proposed in the present disclosure.

In this regard, based on pre-configured/defined MCS table(s) (e.g., MCS table(s) related to general PUSCH transmission), a method of configuring/indicating an MCS index subset related to repeated transmission of Msg3 PUSCH may be considered/applied.

The embodiments described in the present disclosure are divided only for convenience of explanation, and each embodiment may be applied independently, or some configurations of the embodiments may be applied in combination, of course.

Embodiment 1

This embodiment relates to a method of using contiguous MCS indexes (based on pre-configured/defined MCS table(s)) but assigning/specifying only the start index.

For example, a method in which the base station additionally indicates a start index to the UE through system information (SI) (e.g., SIB, etc.) in advance (i.e., pre-) may be considered. At this time, the UE may interpret the corresponding start index value as the minimum value of the MCS index subset available for the repeatedly transmitted Msg3 PUSCH. In other words, a certain number (e.g., 2^(4−X)) of MCS indexes consecutive from the corresponding index (i.e., the start index) may constitute a usable MCS index subset.

The base station may indicate information on the MCS index to be actually used to the UE using the MCS field of some bits (e.g., 4−X bits) remaining in the RAR UL grant. At this time, in order for the UE to interpret the indicated value as the MCS index to be actually used, the terminal may be configured to list the MCS indexes included in the MCS index subset configured as described above in increasing order and then use the MCS index of the order corresponding to the indicated value.

In the case of the method proposed in this embodiment, compared to the method of using the first certain number (e.g., 2^(4−X)) of consecutive MCS indexes without separate pre-indication, there is an advantage in being able to use a higher MCS with a higher rate (e.g. coding rate) depending on the network situation.

Embodiment 2

This embodiment relates to a method of configuring/setting and indicating the entire MCS index subset (based on pre-configured/defined MCS table(s)).

For example, a method in which the base station configures/sets an MCS index subset to the UE through system information (SI) (e.g., SIB, etc.) in advance (i.e., pre-) may be considered. That is, the base station may select a certain number (e.g., 2^(4−X)) of MCS indexes to form an MCS index subset and configure/indicate the UE in advance. The method may be a method of configuring/indicating a certain number (e.g., 2^(4−X)) of MCS indexes and may be a method of indicating one of the candidates of a pre-configured/promised MCS index subset.

The base station may indicate information on the MCS index to be actually used to the UE using the MCS field of some bits (e.g., 4−X bits) remaining in the RAR UL grant. At this time, in order for the UE to interpret the indicated value as the MCS index to be actually used, the UE may be configured to list the MCS indexes included in the MCS index subset configured as described above in increasing order and then use the MCS index of the order corresponding to the indicated value.

In the case of the method proposed in this embodiment, compared to a method that has no choice but to configure an MCS index subset only with continuous MCS indexes (e.g., a method according to the existing method, the method in Embodiment 1 described above, etc.), an MCS index subset may also be configured from non-contiguous MCS indexes. This has the advantage of being able to configure an MCS index subset with MCS indices corresponding to a wider range of rates (e.g., coding rate).

Embodiment 3

This embodiment relates to a method for setting/configuring/indicating an MCS index subset (based on pre-configure/defined MCS table(s)) based on/linked to the maximum (max) value of the number of repetitions available to the UE in relation to repetition transmission of Msg3 PUSCH.

For example, a method of configuring the MCS index subset differently depending on the maximum value of the number of available repetitions may be considered. Here, the maximum value of the number of repetitions available may be information configured by the base station to the UE in advance through system information (SI) (e.g. SIB, etc.).

The following example methods may be used to configure an MCS index subset using the maximum value of the number of repetitions available to the UE.

As an example, if the maximum value of the number of available repetitions is greater than a certain reference value, the UE may configure a certain number (e.g., 2^(4−X)) of consecutive MCS indexes with the lowest rate (e.g., coding rate) as an MCS index subset. As another example, if the maximum number of available iterations is below a certain threshold value, the UE may configure a certain number (e.g., 2^(4−X)) of contiguous MCS indexes with the highest rate (e.g., coding rate) as an MCS index subset. Here, the base station may configure/indicate the UE with information on a specific reference value in the above-described example.

The base station may indicate information on the MCS index to be actually used to the UE using the MCS field of some bits (e.g., 4−X bits) remaining in the RAR UL grant. At this time, in order for the UE to interpret the indicated value as the MCS index to be actually used, the UE may be configured to list the MCS indexes included in the MCS index subset configured as described above in increasing order and then use the MCS index of the order corresponding to the indicated value.

In the case of the method proposed in this embodiment, by associating/linking the MCS index subset with the maximum value of the number of available repetitions, the overhead for MCS instructions may be reduced. Additionally, this method has the advantage of being able to configure and use an MCS index subset with a wider range of rates (e.g., coding rate).

Embodiment 4

This embodiment relates to a method of configuring/setting and indicating an MCS index subset based on/linked to the number of repetitions configured/indicated to the UE in relation to repetition transmission of Msg3 PUSCH.

For example, a method of configuring the MCS index subset differently depending on the repetition number value indicated to the UE may be considered. Here, the indicated repetition number value may be a value interpreted through information indicated for each UE through some bits (e.g., X bits) of the MCS field of the RAR UL grant.

The following example methods may be used for the UE to configure an MCS index subset through the indicated repetition number value.

As an example, when the indicated repetition number value is greater than a specific reference value, the UE may configure a certain number (e.g., 2^(4−X)) of consecutive MCS indexes with the lowest rate (e.g., coding rate) as an MCS index subset. As another example, if the indicated repetition number value is below a certain reference value, the UE may configure a certain number (e.g., 2^(4−X)) of consecutive MCS indexes with the highest rate (e.g., coding rate) as an MCS index subset. Here, the base station may configure/indicate the UE with information about a specific reference value in the above-described example.

Additionally/alternatively, in order to increase resource operation efficiency by configuring an MCS index subset with non-contiguous MCS indexes, depending on the indicated repetition number value, the interval between MCS indexes belonging to/included in the MCS index subset may be configured differently. In this regard, the following example method may be used.

For example, if the indicated repetition number value is 2N, the MCS index subset may be {(4−N)m|0<=m<2^(4−X)}. With respect to the MCS index subset configured according to that example, if the indicated repetition number value is low, the MCS index subset may be composed of MCS indices with wider intervals. Conversely, when the indicated repetition number value is large, the MCS index subset may be composed of MCS indices with narrower intervals. That is, if the indicated repetition number value is 1, an MCS index subset may be composed of MCS indexes with the widest intervals, in order to cover the entire range of MCS indexes that were available in existing Msg3 transmission.

The base station may indicate information on the MCS index to be actually used to the UE using the MCS field of some bits (e.g., 4−X bits) remaining in the RAR UL grant. At this time, in order for the UE to interpret the indicated value as the MCS index to be actually used, the UE may be configured to list the MCS indexes included in the MCS index subset configured as described above in increasing order and then use the MCS index of the order corresponding to the indicated value.

In the case of the method proposed in this embodiment, by associating/linking the repetition number indicated for each UE with the MCS index subset, the overhead for MCS indication may be reduced. In addition, when using the remaining bits of the MCS field among the UL grant fields to indicate the repetition number value indicated for each UE, a problem of using excessively many frequency resources may occur by indicating a lower MCS value. In contrast, in the case of the method proposed in this embodiment, since various MCS values may be used adaptively according to network conditions, there is an advantage in that excessive use of frequency resources may be prevented. Additionally, the method proposed in this embodiment has the advantage of being able to configure and use MCS index subsets with a different and wider range of rates (e.g., coding rates).

In addition, the methods proposed in the embodiments described above in the present disclosure may be applied with the same/similar principles to not only when the repetition count value is indicated through part of the MCS field of the RAR UL grant, but also when it is indicated through part of the MCS field of the DCI (e.g., the MCS field of DCI format 0_0, etc.) regarding repetition transmission of Msg3 PUSCH.

Figure 8:
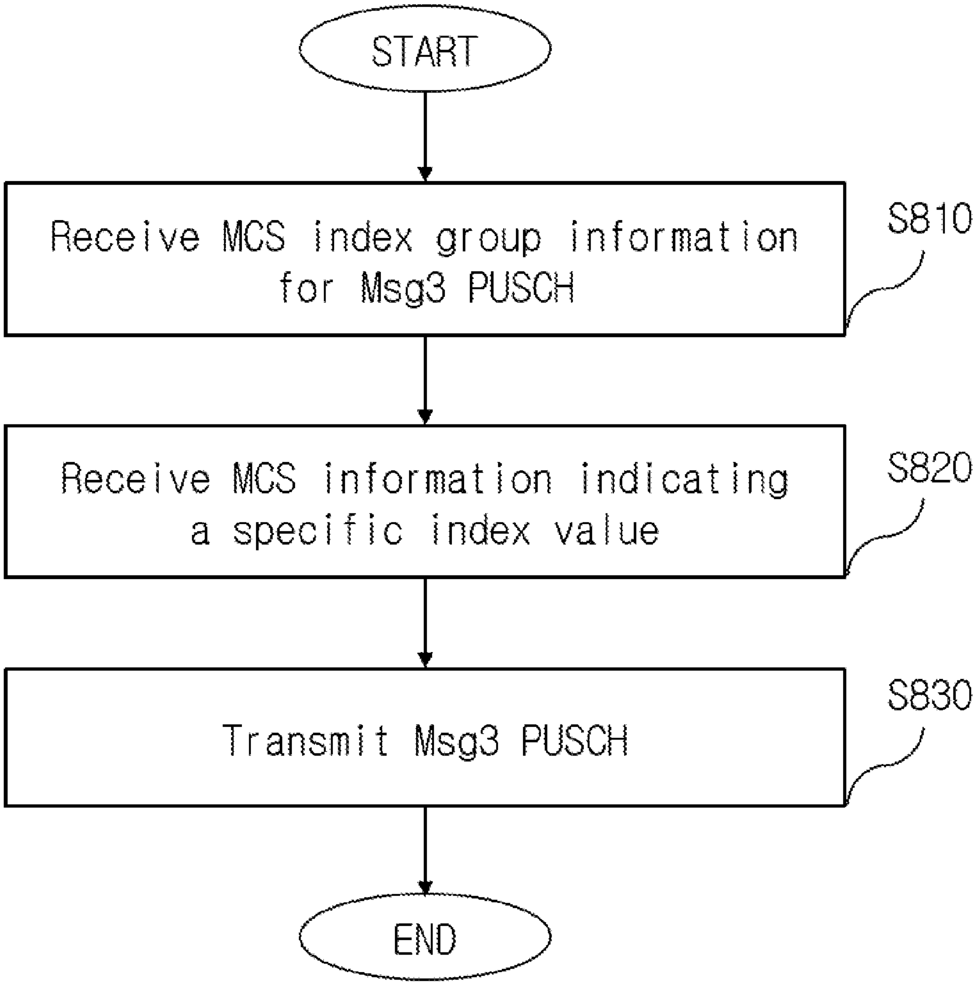
FIG. 8 is a diagram illustrating operations of a UE for a method for performing a random access procedure according to an embodiment of the present disclosure.

FIG. 8 is a diagram illustrating operations of a UE for a method for performing a random access procedure according to an embodiment of the present disclosure.

FIG. 8 illustrates an operation of the UE based on the previously proposed method (e.g., any one of Embodiments 1 to 4 and the detailed embodiments thereof, or a combination of more than one (detailed) embodiments). The example in FIG. 8 is for convenience of explanation and does not limit the scope of the present disclosure. Some step(s) illustrated in FIG. 8 may be omitted depending on the situation and/or setting. Additionally, the UE in FIG. 8 is only examples, and may be implemented as devices illustrated in FIG. 10 below. For example, the processors 102/202 of FIG. 10 may control transmission and reception of channels/signals/data/information, etc. using the transceivers 106/206, and may control to store transmitted or received channels/signals/data/information, etc. in the memory 104/204.

In step S810, based on/according to the repetition transmission for Msg3 PUSCH being configured, the UE may receive information on the MCS index group for Msg3 PUSCH from the base station. That is, the UE may receive information on the MCS index group for repetition transmission of Msg3 PUSCH from the base station. Here, the MCS index group may include one or more MCS index values and may correspond to an MCS index subset in the above-described embodiments (e.g., Embodiments 1 to 4, especially Embodiment 2).

For example, the repetition transmission of the Msg3 PUSCH described above may be based on Type A-based PUSCH repetition transmission (e.g., PUSCH repetition Type A).

Additionally, one or more index values included in the MCS index group may include at least one of contiguous MCS index values or non-contiguous MCS index values. That is, the MCS index group may be composed of contiguous MCS index values and/or non-contiguous MCS index values. In this case, the one or more MCS index values may be assigned to codepoints of the MCS field (in increasing order) within the MCS index group.

Additionally, information on the MCS index group may be configured to the UE through system information (SI) (e.g., SIB, etc.) based on higher layer signaling (e.g., RRC signaling, etc.). Additionally, the corresponding MCS index group may be configured based on an MCS table applicable to the UE among one or more pre-defined MCS tables.

In step S820, the UE may receive MCS information indicating a specific MCS index value among the one or more MCS index values from the base station. Here, the corresponding MCS information may be configured to some bits of the MCS field related to the above-described Msg3 PUSCH.

For example, as in the embodiments described above (e.g. Embodiments 1 to 4, especially Embodiment 2), the base station may indicate the UE the MCS value to be applied to Msg3 PUSCH transmission (e.g., Msg3 PUSCH repetition transmission) through some bits (e.g. 4−X bit, 5−X bit) of the MCS field included in the information scheduling Msg3 PUSCH. At this time, the size of the corresponding some bits may be related to the number of MCS indexes included in the above-described MCS index group. As an example, if the MCS index group includes a certain number (e.g., 2^(4−X)) of MCS indexes, the MCS value may be indicated to the UE through the above-described some bits (e.g., 4−X bits, 5−X bits) of MCS field.

At this time, as in the above-described embodiments (e.g., Embodiments 1 to 4, especially Embodiment 2), the MCS field may be included in at least one of a RAR UL grant related to the Msg3 PUSCH or downlink control information (DCI) (e.g., DCI corresponding to DCI format 0_0 related to retransmission of the Msg3 PUSCH).

In addition, the remaining bits (e.g., X bits) of the MCS field excluding the some bits above may be used to indicate the number of repetitions for the above-described repetition transmission of Msg3 PUSCH. As a specific example, the some bits (e.g., 4−X bits, 5−X bits) correspond to one or more least significant bits (LSBs) of the MCS field, and the remaining bits (e.g., X bits) may correspond to one or more most significant bits (MSBs) of the MCS field.

In step S830, the UE may transmit the Msg3 PUSCH based on the specific index value indicated by the MCS information. For example, the Msg3 PUSCH transmission may correspond to the above-described repetition transmission of Msg3 PUSCH.

Figure 9:
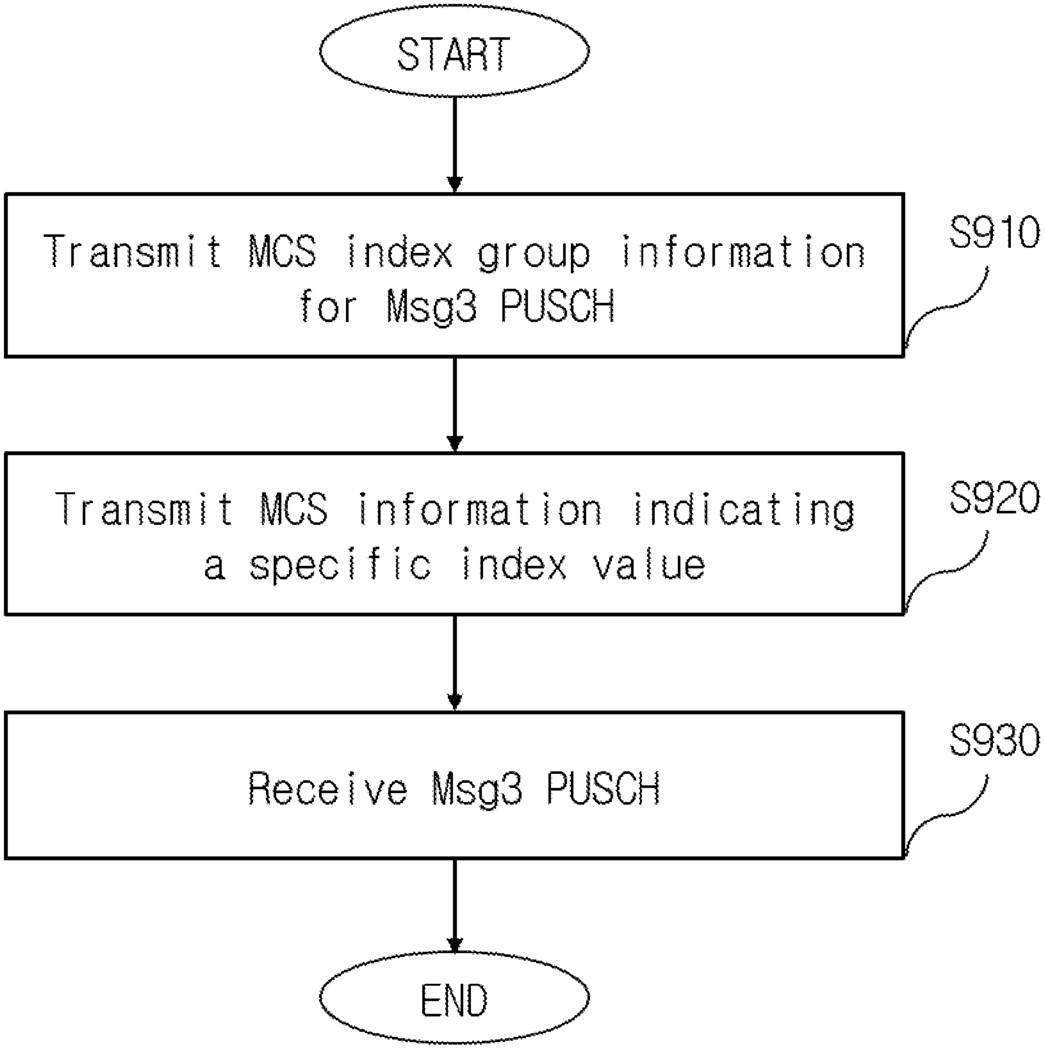
FIG. 9 is a diagram illustrating an operation of a base station for a method of performing a random access procedure according to an embodiment of the present disclosure.

FIG. 9 is a diagram illustrating an operation of a base station for a method of performing a random access procedure according to an embodiment of the present disclosure.

FIG. 9 illustrates an operation of the base station based on the previously proposed method (e.g., any one of Embodiments 1 to 4 and the detailed embodiments thereof, or a combination of more than one (detailed) embodiments). The example in FIG. 9 is for convenience of explanation and does not limit the scope of the present disclosure. Some step(s) illustrated in FIG. 9 may be omitted depending on the situation and/or setting. Additionally, the base station in FIG. 9 is only examples, and may be implemented as devices illustrated in FIG. 10 below. For example, the processors 102/202 of FIG. 10 may control transmission and reception of channels/signals/data/information, etc. using the transceivers 106/206, and may control to store transmitted or received channels/signals/data/information, etc. in the memory 104/204.

In step S910, based on/according to the repetition transmission for Msg3 PUSCH being configured, the base station may transmit information on the MCS index group for Msg3 PUSCH to the UE. That is, the base station may transmit information on the MCS index group for repetition transmission of Msg3 PUSCH to the UE. Here, the MCS index group may include one or more MCS index values and may correspond to an MCS index subset in the above-described embodiments (e.g., Embodiments 1 to 4, especially Embodiment 2).

For example, the repetition transmission of the Msg3 PUSCH described above may be based on Type A-based PUSCH repetition transmission (e.g., PUSCH repetition Type A).

Additionally, one or more index values included in the MCS index group may include at least one of contiguous MCS index values or non-contiguous MCS index values. That is, the MCS index group may be composed of contiguous MCS index values and/or non-contiguous MCS index values. In this case, the one or more MCS index values may be assigned to codepoints of the MCS field (in increasing order) within the MCS index group.

Additionally, information on the MCS index group may be configured to the UE through system information (SI) (e.g., SIB, etc.) based on higher layer signaling (e.g., RRC signaling, etc.). Additionally, the corresponding MCS index group may be configured based on an MCS table applicable to the UE among one or more pre-defined MCS tables.

In step S920, the base station may transmit MCS information indicating a specific MCS index value among the one or more MCS index values to the UE. Here, the corresponding MCS information may be configured to some bits of the MCS field related to the above-described Msg3 PUSCH.

For example, as in the embodiments described above (e.g. Embodiments 1 to 4, especially Embodiment 2), the base station may indicate the UE the MCS value to be applied to Msg3 PUSCH transmission (e.g., Msg3 PUSCH repetition transmission) through some bits (e.g. 4−X bit, 5−X bit) of the MCS field included in the information scheduling Msg3 PUSCH. At this time, the size of the corresponding some bits may be related to the number of MCS indexes included in the above-described MCS index group. As an example, if the MCS index group includes a certain number (e.g., 2^(4−X)) of MCS indexes, the MCS value may be indicated to the UE through the above-described some bits (e.g., 4−X bits, 5−X bits) of MCS field.

At this time, as in the above-described embodiments (e.g., Embodiments 1 to 4, especially Embodiment 2), the MCS field may be included in at least one of a RAR UL grant related to the Msg3 PUSCH or downlink control information (DCI) (e.g., DCI corresponding to DCI format 0_0 related to retransmission of the Msg3 PUSCH).

In addition, the remaining bits (e.g., X bits) of the MCS field excluding the some bits above may be used to indicate the number of repetitions for the above-described repetition transmission of Msg3 PUSCH. As a specific example, the some bits (e.g., 4−X bits, 5−X bits) correspond to one or more least significant bits (LSBs) of the MCS field, and the remaining bits (e.g., X bits) may correspond to one or more most significant bits (MSBs) of the MsCS field.

In step S930, the base station may receive the Msg3 PUSCH based on the specific index value indicated by the MCS information. For example, the Msg3 PUSCH transmission may correspond to the above-described repetition transmission of Msg3 PUSCH.

General Device to which the Present Disclosure May be Applied

Figure 10:
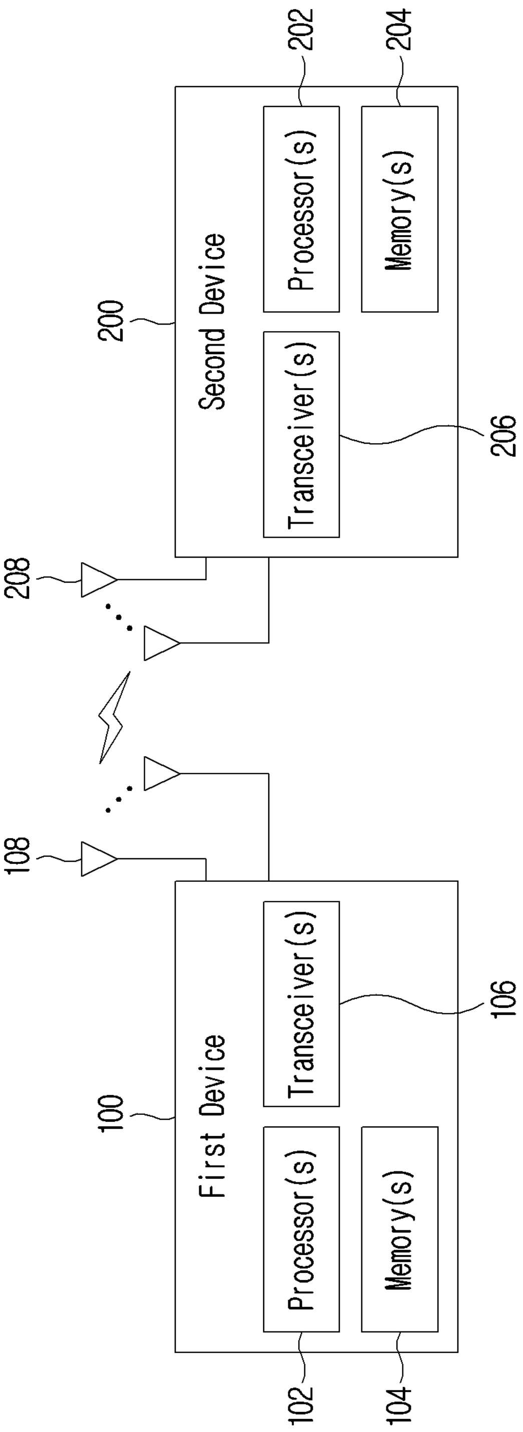
FIG. 10 is a diagram which illustrates a block diagram of a wireless communication device according to an embodiment of the present disclosure.

FIG. 10 illustrates a block diagram of a wireless communication device according to an embodiment of the present disclosure.

In reference to FIG. 10, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method of performing random access procedure by a user equipment (UE) in a wireless communication system, the method comprising:

receiving, from a base station, information on a Modulation and Coding Scheme (MCS) index group for the Message 3 Physical Uplink Shared Channel (Msg3 PUSCH), based on repetition transmission of the Msg3 PUSCH being configured, the MCS index group includes one or more MCS index values;

receiving, from the base station, MCS information indicating a specific MCS index value among the one or more MCS index values; and transmitting the Msg3 PUSCH based on the specific MCS index value indicated by the MCS information, wherein the MCS information is configured to some bits of an MCS field related to the Msg3 PUSCH.

2. The method of claim 1, wherein the repetition transmission of the Msg3 PUSCH is based on a Type A-based PUSCH repetition transmission scheme.

3. The method of claim 1, wherein the MCS field is included in at least one of a random access response (RAR) UL grant or downlink control information (DCI) related to the Msg3 PUSCH.

4. The method of claim 1, wherein a remaining bits of the MCS field excluding the some bits indicate a number of repetitions of the repetition transmission for the Msg3 PUSCH.

5. The method of claim 4, wherein the some bits correspond to one or more least significant bits (LSBs) of the MCS field, and wherein the remaining bits correspond to one or more Most Significant Bits (MSBs) of the MCS field.

6. The method of claim 1, wherein the one or more MCS index values included in the MCS index group include at least one of contiguous MCS index values or non-contiguous MCS index values.

7. The method of claim 1, wherein the one or more MCS index values are assigned in increasing order within the MCS index group.

8. The method of claim 1, wherein information on the MCS index group is configured to the UE through system information.

9. The method of claim 1, wherein the MCS index group is configured based on an MCS table supportable by the UE among one or more predefined MCS tables.

10. A user equipment (UE) for performing random access procedure in a wireless communication system, the UE comprising:

at least one transceiver for transmitting and receiving a wireless signal; and at least one processor for controlling the at least one transceiver, wherein the at least one processor configured to:

receive, from a base station, information on a Modulation and Coding Scheme (MCS) index group for the Message 3 Physical Uplink Shared Channel (Msg3 PUSCH), based on repetition transmission of the Msg3 PUSCH being configured, the MCS index group includes one or more MCS index values;

receive, from the base station, MCS information indicating a specific MCS index value among the one or more MCS index values; and transmit the Msg3 PUSCH based on the specific MCS index value indicated by the MCS information, wherein the MCS information is configured to some bits of an MCS field related to the Msg3 PUSCH.

11. A base station for performing random access procedure in a wireless communication system, the base station comprising:

at least one transceiver; and at least one processor coupled with the at least one transceiver, wherein the at least one processor is configured to:

transmit, to a user equipment (UE), information on a Modulation and Coding Scheme (MCS) index group for the Message 3 Physical Uplink Shared Channel (Msg3 PUSCH), based on repetition transmission of the Msg3 PUSCH being configured, the MCS index group includes one or more MCS index values;

transmit, to the UE, MCS information indicating a specific MCS index value among the one or more MCS index values; and receive the Msg3 PUSCH based on the specific MCS index value indicated by the MCS information, wherein the MCS information is configured to some bits of an MCS field related to the Msg3 PUSCH.

* * * * *